(12) United States Patent
Cloonan et al.

(10) Patent No.: US 10,128,950 B2
(45) Date of Patent: Nov. 13, 2018

(54) DYNAMIC CONTROL AND MODIFICATION OF COAXIAL TAP DIRECTIONALITY

(71) Applicant: ARRIS Enterprises LLC, Suwanee, GA (US)

(72) Inventors: Thomas J. Cloonan, Lisle, IL (US); Jeffrey Joseph Howe, West Chicago, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/394,191

(22) Filed: Dec. 29, 2016

(65) Prior Publication Data

US 2018/0191438 A1 Jul. 5, 2018

(51) Int. Cl.
| | |
|---|---|
| *H04B 10/00* | (2013.01) |
| *H04B 10/25* | (2013.01) |
| *H04B 10/27* | (2013.01) |
| *H04B 10/297* | (2013.01) |
| *H04B 10/2575* | (2013.01) |

(52) U.S. Cl.
CPC ..... *H04B 10/2503* (2013.01); *H04B 10/2575* (2013.01); *H04B 10/27* (2013.01); *H04B 10/297* (2013.01)

(58) Field of Classification Search
CPC ............ H04B 10/2503; H04B 10/2575; H04B 10/27; H04B 10/297; H04B 10/2504; H04B 10/25752; H04B 10/25756; H04B 10/271; H04B 10/278; H04B 10/25753; H04B 10/1125
USPC ......................................................... 398/116
See application file for complete search history.

(56) References Cited

U.S. PATENT DOCUMENTS

| | | | |
|---|---|---|---|
| 6,299,479 B1 | 10/2001 | Tang | |
| 6,643,255 B1 * | 11/2003 | Anhorn | H04B 10/032 348/E7.049 |
| 8,958,694 B2 * | 2/2015 | Miguelez | H04J 14/0226 398/68 |
| 2009/0238559 A1 * | 9/2009 | Pfeiffer | H04B 10/27 398/17 |

* cited by examiner

*Primary Examiner* — M. R. Sedighian
(74) *Attorney, Agent, or Firm* — Lori Anne D. Swanson (57) ABSTRACT

A bi-directional coupler assembly includes a first port for connecting to one of an input forward path RF signal line and an output forward path RF signal line. A second port connects to the other of the input forward path RF signal line and the output forward path RF signal line. A relay is connected between the ports and to at least one directional coupler. In a first state of the relay, an input forward path RF signal delivered from the input forward path RF signal line and through the first port is directed through the at least one directional coupler in a first direction. In a second state of the relay, an input forward path RF signal delivered from the input forward path RF signal line and through the second port is directed through the at least one directional coupler in said first direction.

16 Claims, 6 Drawing Sheets

DYNAMIC CONTROL AND MODIFICATION OF COAXIAL TAP DIRECTIONALITY

TECHNICAL FIELD

The present disclosure relates to a bi-directional coupler, otherwise referred to as a "tap" for distributing radio frequency signals.

BACKGROUND

As is described in U.S. Pat. No. 8,958,694 to the General Instrument Corporation, which is incorporated by reference herein in its entirety, modern cable telecommunications systems are typically built with a Hybrid Fiber Coaxial (HFC) network topology to deliver services to residences and businesses. The HFC network is capable of carrying multiple types of services including one or more of: analog television, digital television, video-on-demand, high-speed broadband internet data, and telephony.

By using Frequency Division Multiplexing, multiple services on these systems are carried on Radio Frequency (RF) signals in the 5 MHz to 1000 MHz frequency band. The HFC topology carries the RF signals in the optical domain on fiber optic cables between the headend/hub office and the neighborhood, and then carries the RF signals in the electrical domain over coaxial cable to and from the home. The fiber optic signals are converted to and from electrical RF signals in a device called a fiberoptic "node." In the coaxial portion of the network, the signal is split to different housing areas and then tapped off to the individual homes by a bi-directional coupler, which is otherwise referred to as a "tap." The taps of the network connect the homes in a tree and branch configuration off of the node.

The RF signals continue to be delivered through the home on coaxial cables and are connected to devices in the home. Due to attenuation in the coaxial cable and split/tap losses, "RF amplifiers" are used periodically to amplify the electrical signal so that it is at an acceptable level to be received by the devices at the home.

Information is transported from the headend/hub office to the home, such as video, voice and internet data, over the HFC network. Also, information is transported back from the home to the headend/hub office, such as control signals to order a movie or internet data to send an email. The HFC network is bi-directional, meaning that signals are carried on the same network from the headend/hub office to the home, and from the home to the headend/hub office. The same coaxial cable carries the signals in both directions. In order to do this, the frequency band is divided into two sections, "forward path" and "return path," so there is no interference of signals. The "forward path" or "downstream" signals, which typically occupy the frequencies from 52 MHz to 1000 MHz, originate in the headend or hub as an optical signal, travel to the node, are converted to electrical RF in the node, and then proceed to the home as electrical signals over coaxial cable. Conversely, the "return path" or "upstream" signals, which typically occupy the frequencies from 5 MHz to 42 MHz, originate in the home and travel over the same coaxial cable as the "forward path" signals. The electrical signals are converted to optical signals in the node, and continue to the hub or headend over fiber optic cables.

Figure 1:
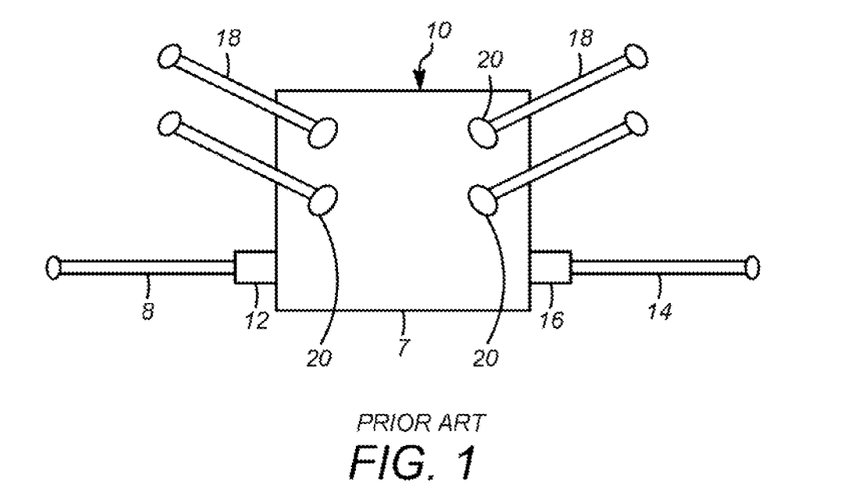
FIG. 1 depicts a block diagram of a conventional tap.
Figure 2:
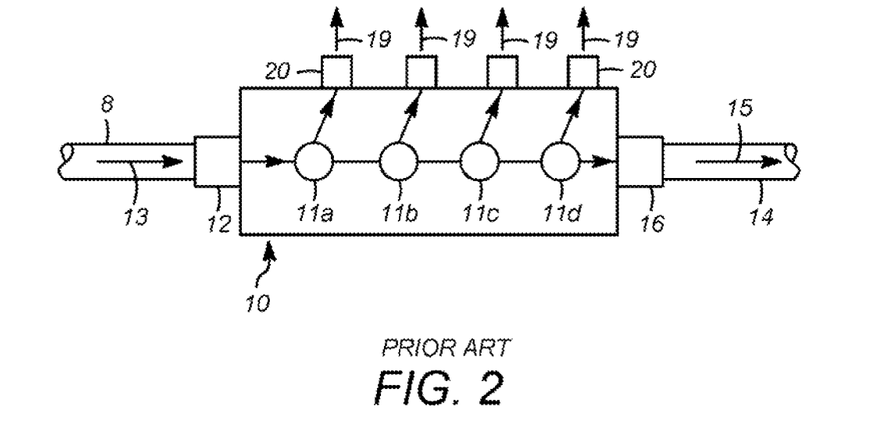
FIG. 2 depicts a schematic view of a forward path signal propagating through the conventional tap of FIG. 1.
Figure 3:
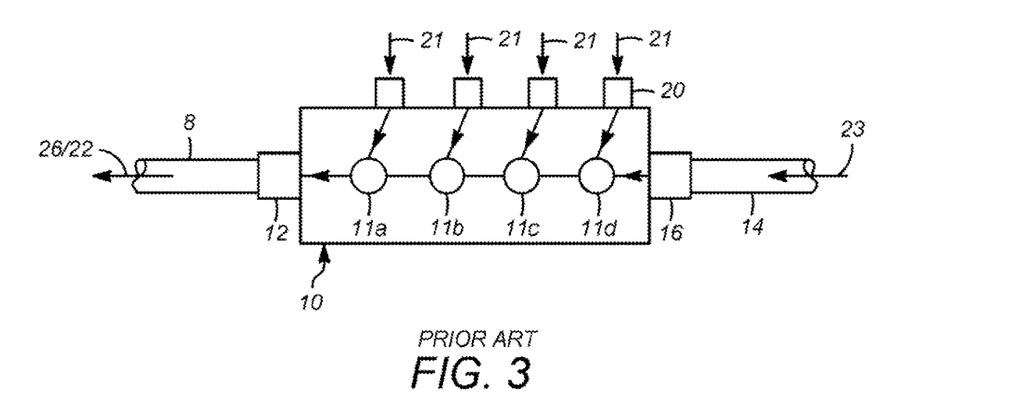
FIG. 3 depicts a schematic of a return path signal propagating through the conventional tap of FIG. 1.

Referring back to the taps of the HFC network, a conventional tap 10 is shown in FIGS. 1-3. The tap 10 includes a housing 7 having a line input port 12, a line output port 16, a plurality of drop output ports 20, and a series of directional couplers 11a-11d (referred to collectively as directional couplers 11) contained within an interior space of the housing 7. The directional couplers 11 are connected in series between the line input port 12 and the line output port 16, as shown. Each directional coupler 11 is also connected to a respective drop output port 20.

In operation, an input forward path RF signal line 8 is mechanically and electrically connected to the line input port 12. An output forward path RF signal line 14 is mechanically and electrically connected to the line output port 16. Drop cables 18 are mechanically and electrically connected to the respective drop output ports 20. As shown in FIG. 2, the input forward path RF signal line 8 distributes a 52 MHz to 1000 MHz forward path RF input signal 13 into the tap 10. The forward path RF signal 13 passes through the directional couplers 11 within the tap 10. As the forward path RF signal 13 passes through each directional coupler 11, tapped forward path RF signals 19 (each at −26 dB relative to the forward path RF signal 13) are output through respective drop cables 18 in the downstream direction to respective homes (or other devices or locations). The forward path RF output signal 15 (at −1 dB relative to the forward path RF input signal 13) is output through the line output port 16 of the tap 10. The forward path RF output signal 15 is then distributed through the output forward path RF signal line 14 in the downstream direction to a further tap (or other device).

Referring now to FIG. 3, the tap 10 is also configured to deliver 5 MHz to 42 MHz return path input signals in the upstream direction. In operation, the 5 MHz to 42 MHz drop return path input signals 21 are delivered from respective drop cables 18 into the tap 10, through one or more directional couplers 11, and a resulting output return path signal 22 (at −26 dB relative to the drop return path RF signal 21) is delivered into the RF signal line 8, and into the node (not shown) that is connected to the RF signal line 8. A 5 MHz to 42 MHz return path RF input signal 23 is also delivered from the RF signal line 14 into the tap 10. The return path RF input signal 23 passes through the directional couplers 11, and the resulting output return path signal 26 (at −1 dB relative to the return path RF input signal 23) is delivered through the RF signal line 8, and into the node (not shown) that is connected to the RF signal line 8.

The tap 10 is a directional component that is intended to be operated in one direction only (i.e., forward path downstream and return path upstream) due to the design of the directional couplers 11 within the tap. In other words, the input forward path RF signal line 8 can only be connected to the line input port 12. If the input forward path RF signal line 8, which carries a 52 MHz to 1000 MHz signal, were mistakenly connected to the line output port 16 of the tap 10, then the tap 10 would not operate properly. The signals on the drop cables 18 would be significantly degraded or non-existent.

In the event of a redesign of an existing HFC network, such as by adding additional nodes to the network, a forward direction RF signal could be delivered through the coaxial cable and the taps in a direction that is opposite the direction over which the RF signal was delivered prior to the redesign. In other words, due to the redesign, the forward direction RF signal line would be connected to the line output port of an existing tap. Due to the above-described directionality limitation of the taps, the redesign would necessitate either time-consuming re-cabling to/from the tap (i.e., to connect the input forward path RF signal line 8 to the line input port of the tap and connect the line output port of the tap to the cable 14) or costly replacement of the faceplate of the tap to reverse its directionality. In view of the foregoing, there exists a need for easily reversing the directionality of a tap.

SUMMARY

The present disclosure describes a bi-directional coupler assembly and a method for operating the bi-directional coupler assembly.

According to one implementation, a bi-directional coupler assembly comprises a first port for connecting to one of an input forward path RF signal line and an output forward path RF signal line. A second port connects to the other of the input forward path RF signal line and the output forward path RF signal line. At least one relay is connected between the first port and the second port, the relay being configured to be operated in either a first state or a second state. At least one directional coupler is connected to the at least one relay. In the first state of the at least one relay, an input forward path RF signal delivered from the input forward path RF signal line and through the first port is directed through the at least one directional coupler in a first direction. In the second state of the at least one relay, an input forward path RF signal delivered from the input forward path RF signal line and through the second port is directed through the at least one directional coupler in said first direction.

According to another implementation, a method for operating a bi-directional coupler assembly comprising a first port, a second port, at least one relay connected between the first port and the second port, and at least one directional coupler connected to the at least one relay is provided. The method comprises the steps of delivering an input forward path RF signal into the first port, through the at least one directional coupler in a first direction, and into the second port; switching a state of the at least one relay; and delivering the input forward path RF signal into the second port, through the at least one directional coupler in the first direction and into the first port.

BRIEF DESCRIPTION OF THE DRAWINGS

The invention is best understood from the following detailed description when read in connection with the accompanying drawings, with like elements having the same reference numerals. According to common practice, the various features of the drawings are not drawn to the scale. Also, the dimensions of the various features may be arbitrarily expanded or reduced for clarity. Included in the drawings are the following figures.

DETAILED DESCRIPTION

Figure 4:
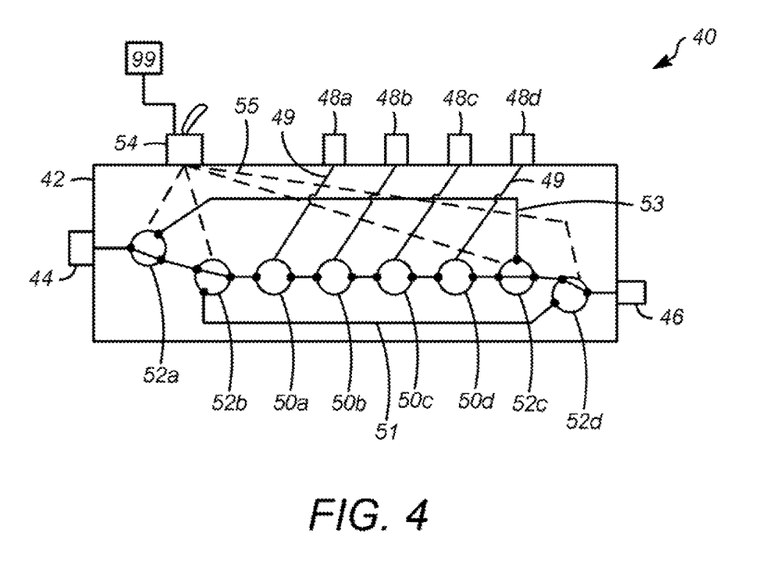
FIG. 4 depicts a block diagram of a tap, according to one exemplary embodiment of the invention.

FIG. 4 depicts a block diagram of a tap 40, according to one exemplary implementation. The tap 40 is similar to the tap 10 described above, with the primary exception that the tap 40 includes hardware to enable the input forward path RF signal line to be connected to either the line input port or the line output port of the tap 40.

The tap 40 generally includes a housing 42 having a first port 44, a second port 46 and a plurality of four drop output ports 48a-48d. The ports 44 and 46 are referred to as first and second ports, respectively, as opposed to line input and line output ports because each port 44 and 46 could serve as either a line input port or a line output port depending upon the state or position of a switch 54, as will be described later. Each port 44, 46 and 48a-48d is mounted to an exterior surface of the housing 42 to be user accessible. Each port 44, 46 and 48a-48d is also provided in the form of an electrical connector such as that disclosed in U.S. Pat. No. 6,299,479 to Tang, which is incorporated by reference herein in its entirety and for all purposes.

A series of directional couplers 50a-50d, like those described with reference to FIG. 1, are contained within the housing 42 for conveying a portion of the signal flowing therethrough to a drop output port 48a-48d, respectively. The directional couplers 50a-50d are connected in series to the first port 44 and the second port 46, as shown. Each directional coupler 50a-50d is also connected to a drop output port 48a-48d, respectively, via a line 49.

In an alternative embodiment, the tap 40 includes only one directional coupler 50 in order to minimize insertion losses. The single directional coupler 50 is coupled to a splitter (not shown) that is positioned within the housing 42, and the splitter is connected to the individual drop output ports 48a-48d.

Four electrically operated coaxial switches, in the form of two-position relays 52a-52d, are also contained within the housing 42 for changing the path of the signals that are distributed within the tap 40. Each relay 52a-52d is a single-pole double-throw (SPDT) switch. A suitable SPDT switch is sold and distributed by the Dow-Key Microwave Corporation of Ventura, California, U.S.A. Two relays 52a and 52b are connected to each other between the first port 44 and the directional coupler 50a. Similarly, two relays 52c and 52d are connected to each other between the second port 46 and the directional coupler 50d. Each relay 52a-52d contains a moveable contact that is capable of switching between two different positions (compare the position of the internal contact of relay 52a in FIGS. 5 and 6, for example). The relays 52a-52d may be any commercially available two-position relay that is known in the art. Relays 52*a*-52*d* may be commercially available silicon switches, for example.

An electrical connection 51 connects the relays 52*b* and 52*d*, and another electrical connection 53 connects the relays 52*a* and 52*c*. The electrical connections 51 and 53 are utilized when the tap 40 is operated in the reverse configuration shown in FIG. 6. Each electrical connection 51 and 53 may be a wire, cable, or circuit board trace, for example.

The relays 52*a*-52*d* are concurrently controlled by a user-operated switch 54 that is mounted to an exterior surface of the housing 12. The electrical connections between the switch 54 and the relays 52*a*-52*d* are depicted by broken lines. The switch 54 may be a toggle switch as shown, or any other type of switch. The switch 54 could also be remotely controlled wirelessly by a transceiver 99 and/or may not be user-accessible. The switch 54 may be mounted to the housing 12, as shown, or it may be mounted exterior to housing 12. The switch 54 may be protected from unauthorized access by a lock and key system (not shown).

A wide variety of commercially available ports, directional couplers and relays may be used in tap 40. The relays, directional couplers, ports and couplers of the tap 40 are electrically interconnected to each other, either directly or indirectly, by wires, cables, conductors or traces, for example.

In use, the input forward path RF signal line 8 is connected to either one of the first port 44 and the second port 46 (unlike the tap 10). The output forward path RF signal line 14 is connected to the other of the first port 44 and the second port 46. Drop cables 18 are connected to the respective drop output ports 48*a*-48*d*.

Figure 5:
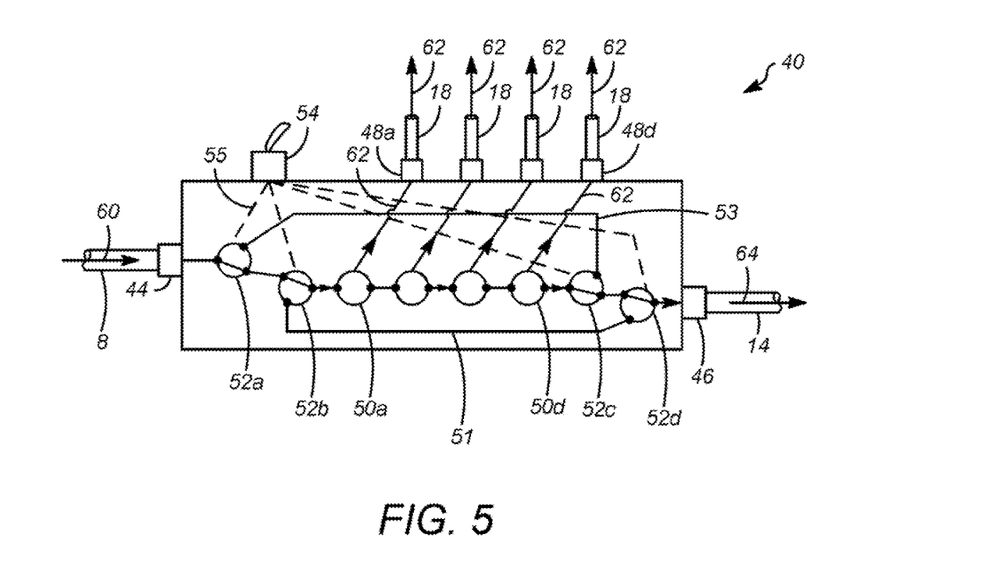
FIG. 5 depicts a schematic of the tap of FIG. 4 operated in a standard configuration (i.e., forward path signal propagating from left to right through the tap).

FIG. 5 depicts a schematic of the tap 40 operated in a standard configuration (i.e., a forward path input signal propagating from left to right through the tap 40, and a return path input signal propagating from right to left through the tap 40). As shown in FIG. 5, in operation of the tap 40, the input forward path RF signal line 8 distributes a 52 MHz to 1000 MHz forward path RF input signal 60 into the first port 44 of the tap 40. The forward path RF input signal 60 is distributed into the relay 52*a*, and, due to the contact position of the relay 52*a*, the signal 60 is then distributed into the relay 52*b*. Due to the contact position of the relay 52*b*, the signal 60 is then successively distributed through all of the directional couplers 50*a*-50*d*. As the forward path RF signal 60 passes through each directional coupler 50*a*-50*d*, tapped forward path RF signals 62 (each at −26 dB relative to the forward path RF signal 60) are output through respective drop cables 18 in the downstream direction to respective homes (or other devices or locations).

The forward path RF input signal 60 is also distributed from the directional coupler 50*d* and into the relay 52*c*. Due to the contact position of the relay 52*c*, the signal 60 is then distributed into the relay 52*d*. A forward path RF output signal 64 (at −1 dB relative to the forward path RF input signal 60) is output through the second port 46 of the tap 40. The forward path RF output signal 64 is then distributed through the output forward path RF signal line 14 in the downstream direction to a further tap (or other device).

Referring still to FIG. 5, the tap 40 is also configured to deliver 5 MHz to 42 MHz return path signals in the upstream direction, like the tap 10. The directional path of the return path signals is not depicted by the arrows in FIG. 5. In operation, the 5 MHz to 42 MHz drop return path signals are delivered from respective drop cables 18 into the tap 40, through one or more directional couplers 50*a*-50*d*, and a resulting output return path signal (at −26 dB relative to the drop return path RF signal input at the drop output ports 48*a*-48*d*) is delivered via relays 52*b* and 52*a* through the first port 44 and into the RF signal line 8. The resulting output return path signal is then delivered into the node (not shown) that is connected to the RF signal line 8. A 5 MHz to 42 MHz return path RF signal can also be delivered from the RF signal line 14 into the tap 10. More particularly, the return path RF signal passes through the relays 52*d* and 52*c*, through the directional couplers 50*d*-50*a*, through the relays 52*b* and 52*a*, and the resulting output return path signal (at −1dB relative to the return path RF signal input at the second port 46) is delivered through the RF signal line 8, and into the node (not shown) that is connected to the RF signal line 8.

When the tap 40 is operated in the standard configuration (i.e., a forward path signal propagating from left to right through the tap 40), the electrical connection 51 and 53 are not utilized.

Unlike the tap 10, the tap 40 is configured to be operated in two different directions. In other words, the input forward path RF signal line 8 can be connected to the first port 44 or the second port 46.

Figure 6:
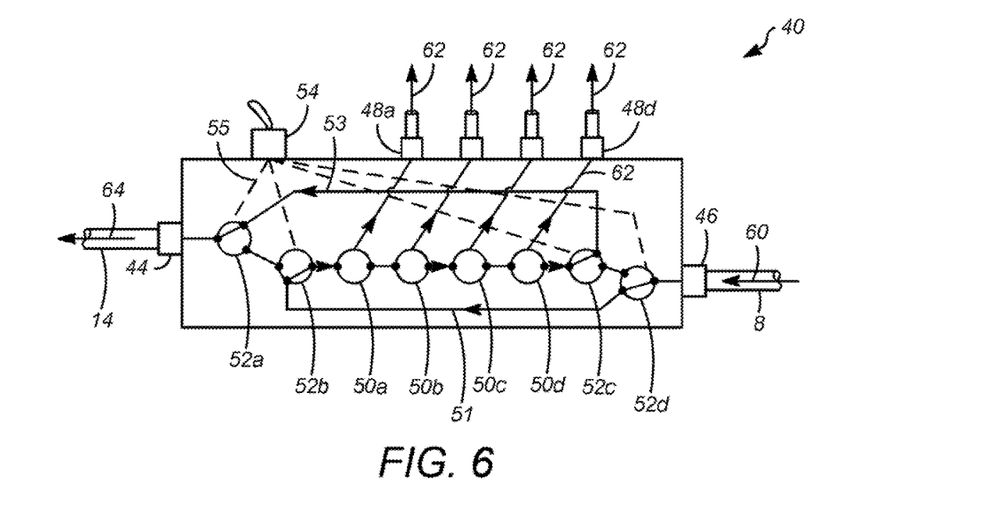
FIG. 6 depicts a schematic of the tap of FIG. 4 operated in a reverse configuration (i.e., forward path signal propagating from right to left through the tap).

FIG. 6 depicts a schematic of the tap 40 operated in a reverse configuration (i.e., a forward path signal propagating from right to left through the tap 40, and a return path signal propagating from left to right through the tap 40). To switch the tap 40 from the standard configuration of FIG. 5 to the reverse configuration of FIG. 6, a user moves the toggle switch 54 from its position in FIG. 5 to the position of FIG. 6. Toggling the switch 54 cause the switch 54 to send a signal via lines 55 to each of the relays 52*a*-52*d*. The signal causes the contact in each relay 52*a*-52*d* to move from its position shown in FIG. 5 to its position shown in FIG. 6, thereby creating a different signal path within the tap 40.

As shown in FIG. 6, in the reverse configuration of the tap 40, the input forward path RF signal line 8 distributes a 52 MHz to 1000 MHz forward path RF input signal 60 into the second port 46 of the tap 40. The forward path RF signal 60 is distributed into the relay 52*d*, and, due to the contact position of the relay 52*d*, the signal 60 is then distributed through the connection 51 and into the relay 52*b*. Due to the contact position of the relay 52*b*, the signal 60 is then successively distributed through all of the directional couplers 50*a*-50*d*. As the forward path RF signal 60 passes through each directional coupler 50*a*-50*d*, tapped forward path RF signals 62 (each at −26 dB relative to the forward path RF signal 60) are output through respective drop cables 18 in the downstream direction to respective homes (or other devices or locations).

The forward path RF input signal 60, which has travelled through the directional couplers 50*a*-50*d*, is then distributed from the last directional coupler 50*d* and into the relay 52*c*. Due to the contact position of the relay 52*c*, the signal 60 is then distributed through the connection 53, through the relay 52*a*, and into the first port 44. A forward path RF output signal 64 (at −1 dB relative to the forward path RF input signal 60) is output through the first port 44 of the tap 40. The forward path RF output signal 64 is then distributed through the output forward path RF signal line 14 in the downstream direction to a further tap (or other device).

Referring still to FIG. 6, the tap 40, now configured in the reverse configuration, is also configured to deliver 5 MHz to 42 MHz return path signals in the upstream direction. The directional path of the return path signals is not depicted by the arrows in FIG. 6. In operation, the 5 MHz to 42 MHz drop return path signals are delivered from respective drop cables 18 into the tap 40, and through one or more directional couplers 50a-50d. A resulting output return path signal (at −26 dB relative to the drop return path RF signal input at the drop output ports 48a-48d) is delivered through the relay 52b, through the connection 51, through the relay 52d, through the second port 46 and into the RF signal line 8. The resulting output return path signal is then delivered into the node (not shown) that is connected to the RF signal line 8.

A 5 MHz to 42 MHz return path RF signal can also be delivered from the RF signal line 14 into the tap 10. More particularly, the return path RF signal passes from the first port 44, through the relay 52a, through the connection 53, through the relay 52c, through the directional couplers 50d-50a, through the relay 52b, through the relay 52d, and into the RF signal line 8 at the second port 46. The resulting output return path signal (at −1 dB relative to the return path RF signal input at the first port 44) is delivered through the RF signal line 8, and into the node (not shown) that is connected to the RF signal line 8.

To then switch the tap 40 from the reverse configuration of FIG. 6 to the standard configuration of FIG. 5, a user moves the toggle switch 54 from its position in FIG. 6 to the position of FIG. 5. Toggling the switch 54 causes the switch 54 to send a signal via lines 55 to each of the relays 52a-52d, and the signal causes the contact in each relay 52a-52d to move from its position shown in FIG. 6 back to its position shown in FIG. 5.

Figure 7:
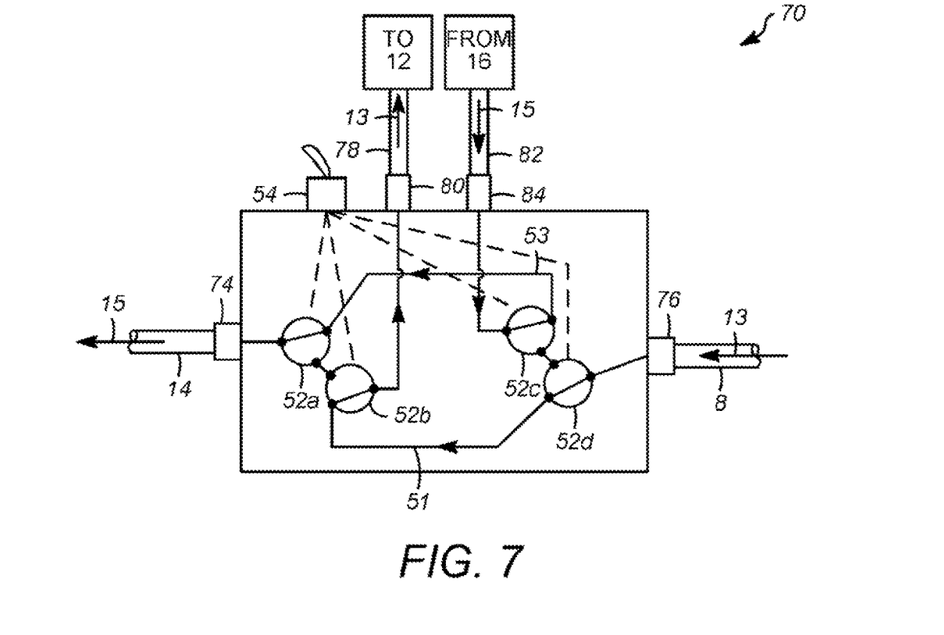
FIG. 7 depicts a schematic of a switching unit operated in a standard configuration (i.e., forward path input signal propagating from left to right).

FIG. 7 shows a switching unit 70 that may be used to retrofit the tap 10 in the event that it becomes necessary to propagate the forward path signal from right to left (instead of from left to right, as shown in FIG. 2). The switching unit 70 and the tap 10 together achieve the same functionality as tap 40, namely, the capability of accommodating a forward path input signal propagating from either right to left or left to right. The switching unit 70 generally comprises a housing 72, and the same switch 54 and relays 52a-52d as the tap 40.

To retrofit the tap 10, the input forward path RF signal line 8 is first disconnected from the tap 10, and the input forward path RF signal line 8 is then connected to the first port 76 of the switching unit 70. The output forward path RF signal line 14 is disconnected from the tap 10, and the output forward path RF signal line 14 is then connected to the second port 74 of the switching unit 70. A cable 78 is connected between a third port 80 of the switching unit 70 and the line input port 12 of the tap 10. Another cable 82 is connected between a fourth port 84 of the switching unit 70 and the line output port 16 of the tap 10. The drop cables 18 remain connected to their respective drop output ports 20 of the tap 10.

In operation, the input forward path RF signal line 8 distributes a 52 MHz to 1000 MHz forward path RF input signal 13 into the first port 76 of the switching unit 70. The forward path RF signal 13 is distributed into the relay 52d, and, due to the contact position of the relay 52d, the signal 13 is then distributed through the connection 51 and into the relay 52b. Due to the contact position of the relay 52b, the signal 13 is then distributed through the third port 80 of the switching unit 70, into the cable 78, and through the line input port 12 of the tap 10. Referring now to FIGS. 2 and 7, the signal 13 then successively passes through all of the directional couplers 11a-11d, as described above with reference to FIG. 2. The attenuated forward path RF output signal 15 (at −1 dB relative to the forward path RF input signal 13) is output from the directional coupler 11d, into the line output port 16 of the tap 10, through the cable 82 and into the fourth port 84 of the switching unit 70. The attenuated forward path RF output signal 15 then travels through the relay 52c. Due to the contact position of the relay 52c, the signal 15 is then distributed through the connection 53, through the relay 52a, and is output through the second port 74 of the switching unit 70. The forward path RF output signal 15 is then distributed through the output forward path RF signal line 14 in the downstream direction to a further tap (or other device).

The switching unit 70 is also configured to handle return path signals that travel in the opposite direction of the arrows shown in FIG. 7. Referring now to FIGS. 3 and 7, in operation, a 5 MHz to 42 MHz return path signal is delivered from output forward path RF signal line 14, to relay 52a, through connection 53, to relay 52c, through cable 82 and into port 16 of tap 10. The return path signal is then delivered through directional couplers 11d-11a, into port 12 of tap 10, through cable 78 and into port 80 of switching unit 70. The return path signal is then delivered into relay 52b, through connection 51, into relay 52d and into port 76. The return path signal is then delivered through signal line 8 in the upstream direction.

The 5 MHz to 42 MHz drop return path signals 21 are also delivered from cables 18 into tap 10, through one or more directional couplers 11a-11d, into port 12 of tap 10, through cable 78 and into port 80 of switching unit 70. The return path signal is then delivered into relay 52b, through connection 51, into relay 52d and into port 76. The return path signal is then delivered through signal line 8 in the upstream direction.

The switching unit 70 may also be used to retrofit a tap (like tap 10) in the event that it becomes necessary to propagate the forward path signal from left to right. In operation, the user would toggle the switch 54 from the position shown in FIG. 7 to the position shown in FIG. 8. Accordingly, the input forward path RF signal line 8 distributes a 52 MHz to 1000 MHz forward path RF input signal 13 into the second port 74 of the switching unit 70. The forward path RF signal 13 is distributed into the relay 52a, then into relay 52b, through the third port 80 of the switching unit 70, into the cable 78, and through the line input port 12 of the tap 10. Referring now to FIGS. 2 and 7, the signal 13 then successively passes through all of the directional couplers 11a-11d, as described above with reference to FIG. 2. The attenuated forward path RF input signal 15 (at −1 dB relative to the forward path RF input signal 13) is output from the directional coupler 11d, into the line output port 16 of the tap 10, through the cable 82 and into the fourth port 84 of the switching unit 70. The attenuated forward path RF output signal 15 then travels through the relay 52c and 52d, and is output through the first port 76 of the switching unit 70. The forward path RF output signal 15 is then distributed through the output forward path RF signal line 14 in the downstream direction to a further tap (or other device).

Figure 8:
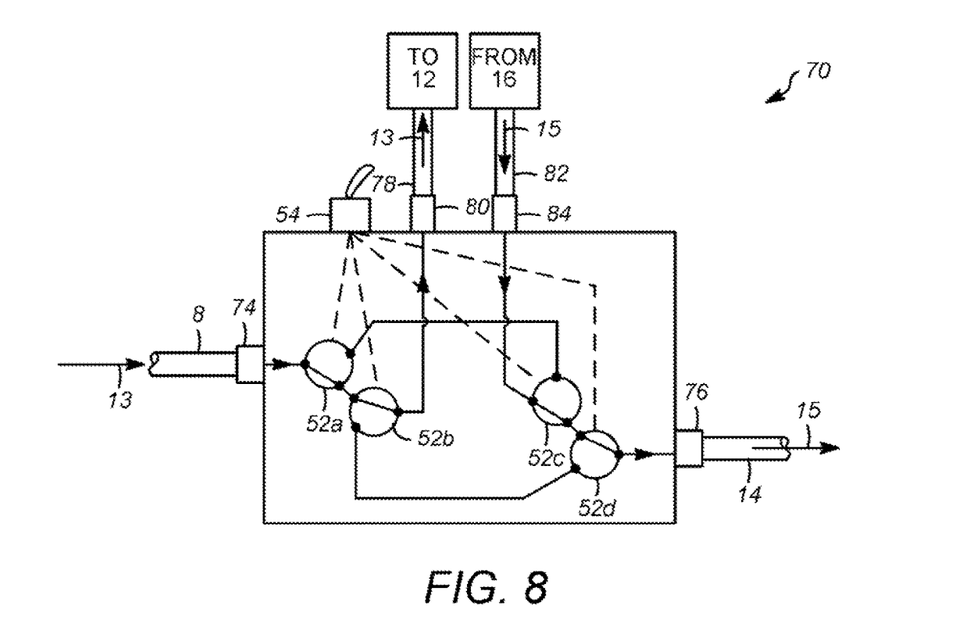
FIG. 8 depicts a schematic of the switching unit of FIG. 7 operated in a reverse configuration (i.e., forward path input signal propagating from right to left).

The switching unit 70 is also configured to handle return path signals that travel in the opposite direction of the arrows shown in FIG. 8. Referring now to FIGS. 3 and 7, in operation, a 5 MHz to 42 MHz return path signal is delivered from output forward path RF signal line 14, through relay 52d, then through relay 52c, through cable 82 and into port 16 of tap 10. The return path signal is then delivered through directional couplers 11d-11a, into port 12 of tap 10, through cable 78 and into port 80 of switching unit 70. The return path signal is then delivered through relay 52b, through relay 52a and into port 74. The return path signal is then delivered through signal line 8 in the upstream direction.

The 5 MHz to 42 MHz drop return path signals 21 are also delivered from cables 18 into tap 10, through one or more directional couplers 11a-11d, into port 12 of tap 10, through cable 78 and into port 80 of switching unit 70. The return path signal is then delivered through relay 52b, then through relay 52a and into port 74. The return path signal is then delivered through signal line 8 in the upstream direction.

Figure 9:
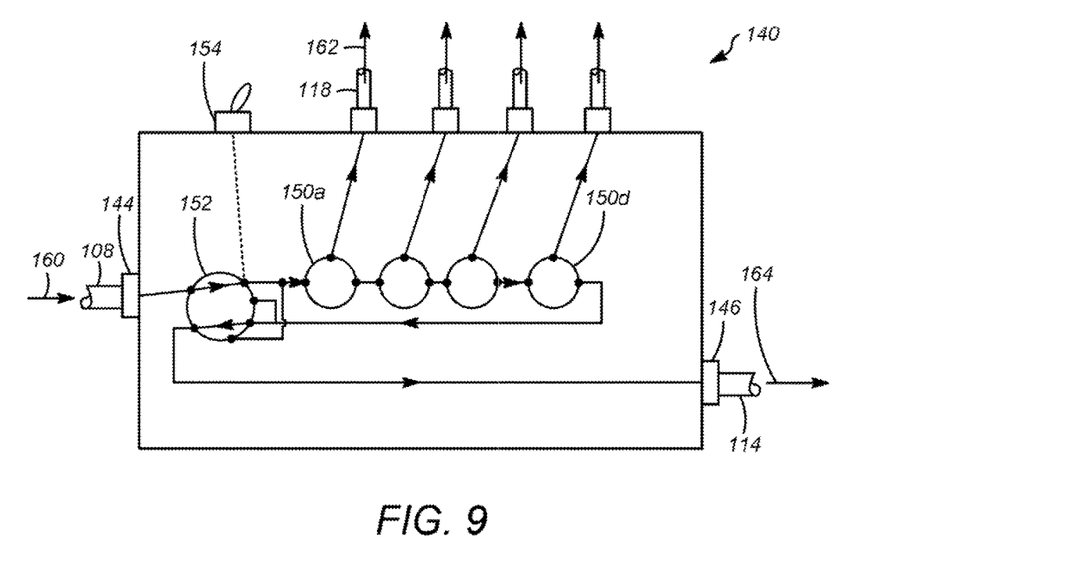
FIG. 9 depicts a schematic of a tap, according to another exemplary embodiment of the invention, operated in a standard configuration (i.e., forward path signal propagating from left to right through the tap).
Figure 10:
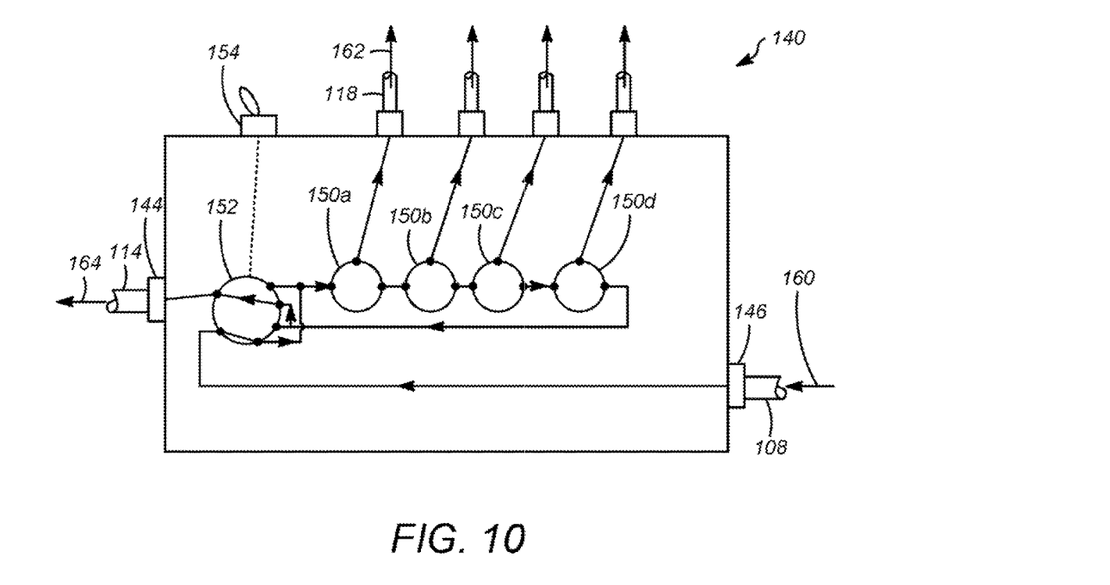
FIG. 10 depicts a schematic of the tap of FIG. 9 operated in a reverse configuration (i.e., forward path signal propagating from right to left through the tap).

FIGS. 9 and 10 depict schematic views of a tap 140, according to another exemplary implementation of a tap. The tap 140 is similar to the tap 40 described above, with the primary exception that the tap 140 includes only one relay 152 in the form of a double-pole, double-throw (DPDT) four-way switch. The relay 152 includes two internal switchable contacts, and each contact is capable of moving between two different positions (compare FIGS. 9 and 10). A suitable DPDT four-way switch is sold and distributed by the Dow-Key Microwave Corporation of Ventura, Calif., USA. Only the primary differences between the taps 40 and 140 will be described hereinafter.

FIG. 9 depicts a schematic of the tap 140 operated in a standard configuration (i.e., a forward path input signal propagating from left to right through the tap 140, and a return path input signal propagating from right to left through the tap 140). Only the forward path will be described hereinafter, however, those skilled in the art will understand how to apply the above description of the return path to the tap shown in FIG. 9.

As shown in FIG. 9, in operation of the tap 140, the input forward path RF signal line 108 distributes a 52 MHz to 1000 MHz forward path RF input signal 160 into the first port 144 of the tap 140. The forward path RF input signal 160 is distributed into the relay 152, and, due to the position of the internal switchable contacts within the relay 152, the signal 160 is then distributed through all of the directional couplers 150a-150d, respectively. As the forward path RF signal 160 passes through each directional coupler 150a-150d, tapped forward path RF signals 162 (each at −26 dB relative to the forward path RF signal 160) are output through respective drop cables 118 in the downstream direction to respective homes (or other devices or locations). As noted above, the tap may include a single directional coupler.

The forward path RF input signal 160 is also distributed from the directional coupler 150d and into the relay 152. Due to the position of the internal switchable contacts within the relay 152, the signal 160 is then distributed through the second port 146 of the tap 140. The forward path RF output signal 164 is then distributed through the output forward path RF signal line 114 in the downstream direction to a further tap (or other device).

FIG. 10 depicts a schematic of the tap 140 of FIG. 9 operated in a reverse configuration (i.e., a forward path signal propagating from right to left through the tap 140, and a return path signal propagating from left to right through the tap 140). To switch the tap 140 from the standard configuration of FIG. 9 to the reverse configuration of FIG. 10, the position of the switch 154 is moved (either manually or automatically) from its position in FIG. 9 to the position of FIG. 10.

As shown in FIG. 10, in the reverse configuration of the tap 140, the input forward path RF signal line 108 distributes a 52 MHz to 1000 MHz forward path RF input signal 160 into the second port 146 of the tap 140. The forward path RF signal 160 is distributed into the relay 152, and, due to the position of the switchable internal contacts within the relay 152, the signal 160 is then distributed through all of the directional couplers 150a-150d, respectively. As the forward path RF signal 160 passes through each directional coupler 150a-150d, tapped forward path RF signals 162 (each at −26 dB relative to the forward path RF signal 160) are output through respective drop cables 118 in the downstream direction to respective homes (or other devices or locations).

The forward path RF input signal 160, which has travelled through the directional couplers 150a-150d, is then distributed from the last directional coupler 150d and back into the relay 152. Due to the position of the internal switchable contacts within the relay 152, the signal 160 is then output through the first port 144 of the tap 140. The forward path RF output signal 164 is then distributed through the output forward path RF signal line 114 in the downstream direction to a further tap (or other device).

Figure 11:
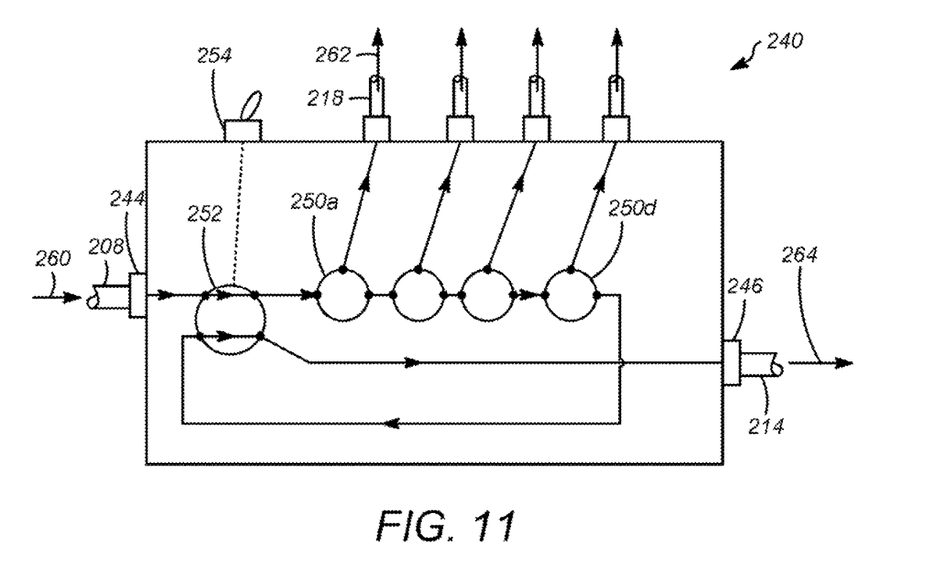
FIG. 11 depicts a schematic of a tap, according to yet another exemplary embodiment of the invention, operated in a standard configuration (i.e., forward path signal propagating from left to right through the tap).
Figure 12:
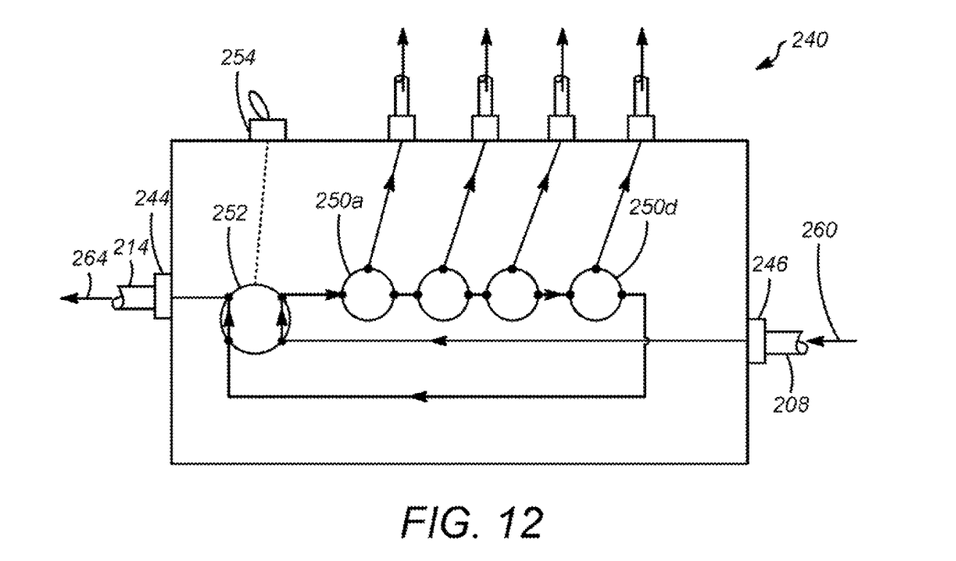
FIG. 12 depicts a schematic of the tap of FIG. 11 operated in a reverse configuration (i.e., forward path signal propagating from right to left through the tap).

FIGS. 11 and 12 depict schematic views of a tap 240, according to yet another exemplary implementation of a tap. The tap 240 is substantially identical to the tap 140 described above, with the primary exception that the relay 252 of the tap 240 comprises a DPDT transfer switch. The DPDT transfer switch relay 252 includes four energizable contacts that are capable of forming a connection when energized (compare FIGS. 11 and 12). The four energizable contacts do not form a connection when de-energized. A suitable DPDT transfer switch is sold and distributed by the Dow-Key Microwave Corporation of Ventura, California, USA.

FIG. 11 depicts a schematic of the tap 240 operated in a standard configuration (i.e., a forward path input signal propagating from left to right through the tap 240, and a return path input signal propagating from right to left through the tap 240). Only the forward path will be described hereinafter, however, those skilled in the art will understand how to apply the above description of the return path to the tap shown in FIG. 11.

As shown in FIG. 11, in operation of the tap 240, the input forward path RF signal line 208 distributes a 52 MHz to 1000 MHz forward path RF input signal 260 into the first port 244 of the tap 240. The forward path RF input signal 260 is distributed into the relay 252, and, due to the energized state of two contacts within the relay 252, the signal 260 is then sequentially distributed through all of the directional couplers 250a-250d. As the forward path RF signal 260 passes through each directional coupler 250a-250d, tapped forward path RF signals 262 (each at −26 dB relative to the forward path RF signal 260) are output through respective drop cables 218 in the downstream direction to respective homes (or other devices or locations).

The forward path RF input signal 260 is also distributed from the directional coupler 250d and into the relay 252. Due to the energized state of the aforementioned two contacts within the relay 252, the signal 260 is distributed through the second port 246 of the tap 240. The forward path RF output signal 264 is then distributed through the output forward path RF signal line 214 in the downstream direction to a further tap (or other device).

FIG. 12 depicts a schematic of the tap 240 of FIG. 11 operated in a reverse configuration (i.e., a forward path signal propagating from right to left through the tap 240, and a return path signal propagating from left to right through the tap 240). To switch the tap 240 from the standard configuration of FIG. 11 to the reverse configuration of FIG. 12, the position of the switch 254 is moved (either manually or automatically) from its position in FIG. 11 to the position of FIG. 12.

As shown in FIG. 12, in the reverse configuration of the tap 240, the input forward path RF signal line 208 distributes a 52 MHz to 1000 MHz forward path RF input signal 260 into the second port 246 of the tap 240. The forward path RF signal 260 is distributed into the relay 252, and, due to the energized state of two different contacts within the relay 252, the signal 260 is then distributed through all of the directional couplers 250a-250d, respectively. As the forward path RF signal 260 passes through each directional coupler 250a-250d, tapped forward path RF signals 262 (each at −26 dB relative to the forward path RF signal 260) are output through respective drop cables 218 in the downstream direction to respective homes (or other devices or locations).

The forward path RF input signal 260, which has travelled through the directional couplers 250a-250d, is then distributed from the last directional coupler 250d and back into the relay 252. Due to the energized state of the aforementioned two different contacts within the relay 252, the signal 260 is then output through the first port 244 of the tap 240. The forward path RF output signal 264 is then distributed through the output forward path RF signal line 214 in the downstream direction to a further tap (or other device).

All of the relays described above with reference to FIGS. 4-11 are controlled using line power of HFC network. One way to avoid using line power for controlling the relays is to replace each relay with a mechanical switch. Another way to avoid using line power for controlling the relays is to replace each relay with a latching relay. In operation, the technician would apply power (e.g. using a battery) to the appropriate terminals of the latching relay to cause the latching relay to change to the desired configuration. Suitable latching relays are sold and distributed by the Omron Corporation of Japan.

Although the invention is illustrated and described herein with reference to specific examples, the invention is not intended to be limited to the details shown. Rather, various modifications may be made in the details within the scope and range of equivalents of the claims and without departing from the invention.

What is claimed is:

1. A bi-directional coupler assembly comprising:
a first port for connecting to one of an input forward path RF signal line and an output forward path RF signal line;
a second port for connecting to the other of the input forward path RF signal line and the output forward path RF signal line;
at least one relay connected between the first port and the second port, the relay configured to be operated in either a first state or a second state;
at least one directional coupler connected to the at least one relay; and
wherein in the first state of the relay, an input forward path RF signal delivered from the input forward path RF signal line and through the first port is directed through the at least one directional coupler in a first direction, and in the second state of the relay, an input forward path RF signal delivered from the input forward path RF signal line and through the second port is directed through the at least one directional coupler in said first direction.

2. The bi-directional coupler assembly of claim 1, wherein in the first state of the relay, an input return path RF signal delivered from the output forward path RF signal line and through the second port is directed through the at least one directional coupler in a second direction opposite the first direction, and in the second state of the relay, an input return path RF signal delivered from the output forward path RF signal line and through the first port is directed through the at least one directional coupler in said second direction.

3. The bi-directional coupler assembly of claim 2, wherein the input return path RF signal is a 5 MHz to 42 MHz signal.

4. The bi-directional coupler assembly of claim 1, wherein the relay is connected to the first port, the second port and the directional coupler.

5. The bi-directional coupler assembly of claim 1, wherein the relay is a double-pole, double-throw (DPDT) four-way switch having two movable internal contacts.

6. The bi-directional coupler assembly of claim 1, wherein the relay is a double-pole, double-throw (DPDT) transfer switch having energizable internal contacts.

7. The bi-directional coupler assembly of claim 1, wherein the at least one relay comprises a first relay, a second relay, a third relay and a fourth relay,
wherein the first relay is connected to the first port;
wherein the second relay is connected to the first relay and the at least one directional coupler;
wherein the third relay is connected to the at least one directional coupler and the first relay;
wherein the fourth relay is connected to the second relay, the third relay and the second port; and
wherein in the first state of each of the relays, the input forward path RF signal delivered from an input forward path RF signal line and through the first port is directed through the at least one directional coupler in said first direction, and in the second state of the each of the relays, an input forward path RF signal delivered from the input forward path RF signal line and through the second port is directed through the at least one directional coupler in said first direction.

8. The bi-directional coupler assembly of claim 7 further comprising a plurality of directional couplers that are connected in series, wherein one of the plurality of directional couplers is connected to the second relay and another one of the plurality of directional couplers is connected to the third relay.

9. The bi-directional coupler assembly of claim 7, wherein in the first state of each of the relays, the first relay is directly connected to the second relay and the third relay is directly connected to the fourth relay.

10. The bi-directional coupler assembly of claim 9, wherein in the first state of each of the relays, the input forward path RF signal delivered through the first port is directed through the first relay, then through the second relay, then through the at least one directional coupler in the first direction, then through the third relay, then through the fourth relay to the second port.

11. The bi-directional coupler assembly of claim 9, wherein in the second state of each of the relays, the first relay is directly connected to the third relay and the second relay is directly connected to the fourth relay.

12. The bi-directional coupler assembly of claim 11, wherein in the second state of each of the relays, the input forward path RF signal delivered from the input forward path RF signal line and through the second port is directed through the third relay before the signal is delivered through the second relay.

13. The bi-directional coupler assembly of claim 1, wherein the at least one relay includes one or more internal contacts that are configured to move between a first position corresponding to the first state and a second position corresponding to the second state.

14. The bi-directional coupler assembly of claim 1, further comprising a housing including an interior space for accommodating the at least one relay and the at least one directional coupler, and wherein the first port and the second port are disposed on the housing to be accessible by a user of the bi-directional coupler assembly.

15. The bi-directional coupler assembly of claim 1 further comprising a switch for switching the at least one relay between the first and second states.

16. The bi-directional coupler assembly of claim 1, wherein the input forward path RF signal is a 52 MHz to 1000 MHz signal.

* * * * *